US012809491B2

(12) United States Patent
Saijo et al.

(10) Patent No.: US 12,809,491 B2
(45) Date of Patent: Nov. 24, 2026

(54) INFORMATION PROVIDING DEVICE, INFORMATION PROVIDING METHOD, AND INFORMATION PROVIDING PROGRAM

(71) Applicant: NTT, Inc., Tokyo (JP)

(72) Inventors: Ryohei Saijo, Tokyo (JP); Takao Kurahashi, Tokyo (JP); Shohei Matsuo, Tokyo (JP); Lidwina Ayu Andarini, Tokyo (JP)

(73) Assignee: NTT, Inc., Tokyo (JP)

( * ) Notice: Subject to any disclaimer, the term of this patent is extended or adjusted under 35 U.S.C. 154(b) by 225 days.

(21) Appl. No.: 18/717,374

(22) PCT Filed: Dec. 8, 2021

(86) PCT No.: PCT/JP2021/045225
§ 371 (c)(1),
(2) Date: Jun. 6, 2024

(87) PCT Pub. No.: WO2023/105698
PCT Pub. Date: Jun. 15, 2023

(65) Prior Publication Data

US 2025/0060854 A1 Feb. 20, 2025

(51) Int. Cl.
*G06F 3/0481* (2022.01)

(52) U.S. Cl.
CPC .................................. *G06F 3/0481* (2013.01)

(58) Field of Classification Search
CPC ...................................................... G06F 3/0481
See application file for complete search history.

(56) References Cited

U.S. PATENT DOCUMENTS

| | | | | |
|---|---|---|---|---|
| 2019/0076736 | A1* | 3/2019 | Timm | A63F 13/213 |
| 2019/0091541 | A1* | 3/2019 | Schulte | A63B 71/06 |
| 2022/0092514 | A1* | 3/2022 | Guru | G06Q 10/1053 |
| 2022/0092943 | A1* | 3/2022 | Piazza | G07F 17/3241 |

FOREIGN PATENT DOCUMENTS

| | | | |
|---|---|---|---|
| JP | 2002287846 | A | 10/2002 |
| JP | 2012234406 | A | 11/2012 |
| JP | 2013021614 | A | 1/2013 |
| JP | 2020017058 | A | 1/2020 |
| JP | 2020047013 | A | 3/2020 |

OTHER PUBLICATIONS

Machino et al. (2010) "Remote-Collaboration System Using Mobile Robot with Camera and Projector" Journal of the Robotics Society of Japan, vol. 28, No. 6, pp. 746-755.

* cited by examiner

*Primary Examiner* — Tadesse Hailu

(57) ABSTRACT

An information providing device (10) estimates a degree of skill of a user for work on the basis of first information (for example, an image of a scene) that is information for specifying a situation in the work and second information (for example, a trajectory of a line of sight) that is information regarding the user who performs the work. The information providing device (10) presents information regarding the work to the user in a format according to the degree of skill estimated.

17 Claims, 10 Drawing Sheets

Fig. 5

121

| WORKER ID | WORK EXPERIENCE (m) | PREVIOUS RECOGNIZED-DEGREE-OF-SKILL ESTIMATED VALUE $\overline{\alpha}$ |
|---|---|---|
| 1 | 1 | 0 |
| 2 | 10 | 0.9 |
| 3 | 5 | 0.6 |

Fig. 6
122
| WORK ID | WORKER ID | SCENE (s') | LINE-OF-SIGHT TRAJECTORY ($x_i$, (t)) | OPERATION RECORD | OPERATION TIME | EVALUATION VALUE (z') |
|---|---|---|---|---|---|---|
| 1 | 3 | 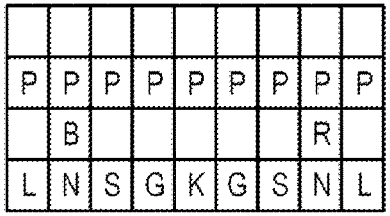  | 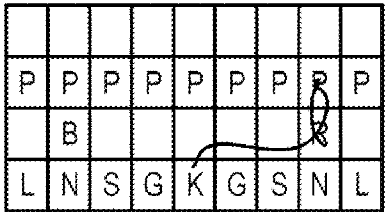  | FIRST PLAYER P 26 | 128[s] | 0.6 |

Fig. 7

123

| INFORMATION ID | CORRESPONDING RECOGNIZED DEGREE OF SKILL | MESSAGE INFORMATION | PRESENTATION FORMAT | PRESENTATION POSITION |
|---|---|---|---|---|
| 1 | $0.0 \leq \alpha < 0.3$ | FIRST PLAYER P 26 | \| \| \| \| \| \| \| \| P \| \|<br>\| P \| P \| P \| P \| P \| P \| P \| \| P \|<br>\| \| B \| \| \| \| \| \| R \| \|<br>\| L \| N \| S \| G \| K \| G \| S \| N \| L \|<br>REASON:<br>SUPPLEMENT: "P" CAN MOVE ONLY ONE SQUARE FORWARD | 27 |
| 2 | $0.3 \leq \alpha < 0.6$ | FIRST PLAYER P 26 | CONTENT:<br>FIRST PLAYER P 26<br>REASON: | 27 |
| 3 | $\alpha \geq 0.6$ | FIRST PLAYER P 26 | 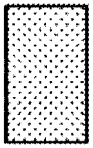 | 27 |

INFORMATION PROVIDING DEVICE, INFORMATION PROVIDING METHOD, AND INFORMATION PROVIDING PROGRAM

CROSS-REFERENCE TO RELATED APPLICATIONS

This application is a U.S. 371 Application of International Patent Application No. PCT/JP2021/045225, filed on 8 Dec. 2021, the disclosure of which is hereby incorporated herein by reference in its entirety.

TECHNICAL FIELD

The present invention relates to an information providing device, an information providing method, and an information providing program.

BACKGROUND ART

In recent years, with development of technologies such as virtual reality (VR), augmented reality (AR), and a remote conference, workers have become enabled to perform intellectual work (shogi, programming, or the like) in cooperation with others who are not there or AI (see, for example, Non Patent Literature 1).

CITATION LIST

Non Patent Literature

Non Patent Literature 1: Machino et al., Remote-Collaboration System Using Mobile Robot with Camera and Projector, Journal of the Robotics Society of Japan, Vol. 28, No. 6, pp. 746-755, 2010

SUMMARY OF INVENTION

Technical Problem

However, in conventional technologies, there is a problem that it may be difficult to present information regarding intellectual work in a format suitable for a user.

In the intellectual work as described above, a degree of skill for the work may vary for each worker. For this reason, it is considered that work efficiency can be improved by exchanging information in a format suitable for the worker.

On the other hand, in a technology described in Non Patent Literature 1, it is difficult to present information in formats suitable for respective workers having different degrees of skill.

Solution to Problem

To solve the above-described problem and achieve an object, an information providing device includes: an estimation unit that estimates a degree of skill of a user for work on the basis of first information that is information for specifying a situation in the work and second information that is information regarding the user who performs the work; and a presentation unit that presents information regarding the work to the user in a format according to the degree of skill estimated by the estimation unit.

Advantageous Effects of Invention

According to the present invention, information regarding intellectual work can be presented in a format suitable for a user.

BRIEF DESCRIPTION OF DRAWINGS

FIG. 5 is a diagram illustrating an example of a worker DB.

FIG. 6 is a diagram illustrating an example of a work record DB.

FIG. 7 is a diagram illustrating an example of a presentation information DB.

DESCRIPTION OF EMBODIMENTS

Hereinafter, an embodiment of an information providing device, an information providing method, and an information providing program according to the present application will be described in detail with reference to the drawings. Note that the present invention is not limited to the embodiments described below.

First Embodiment

Figure 1:
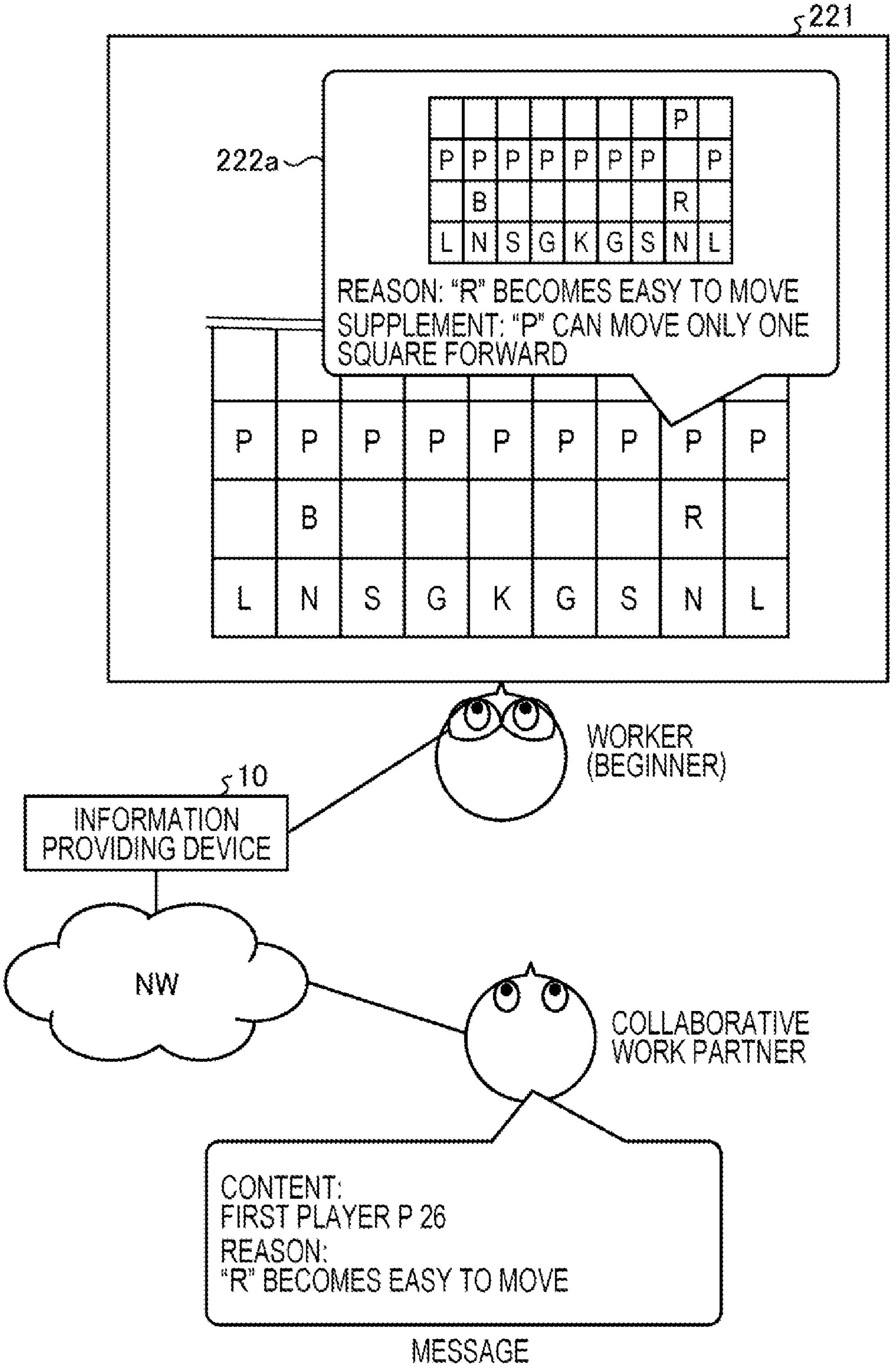
FIG. 1 is a diagram for explaining information presented by an information providing device.
Figure 2:
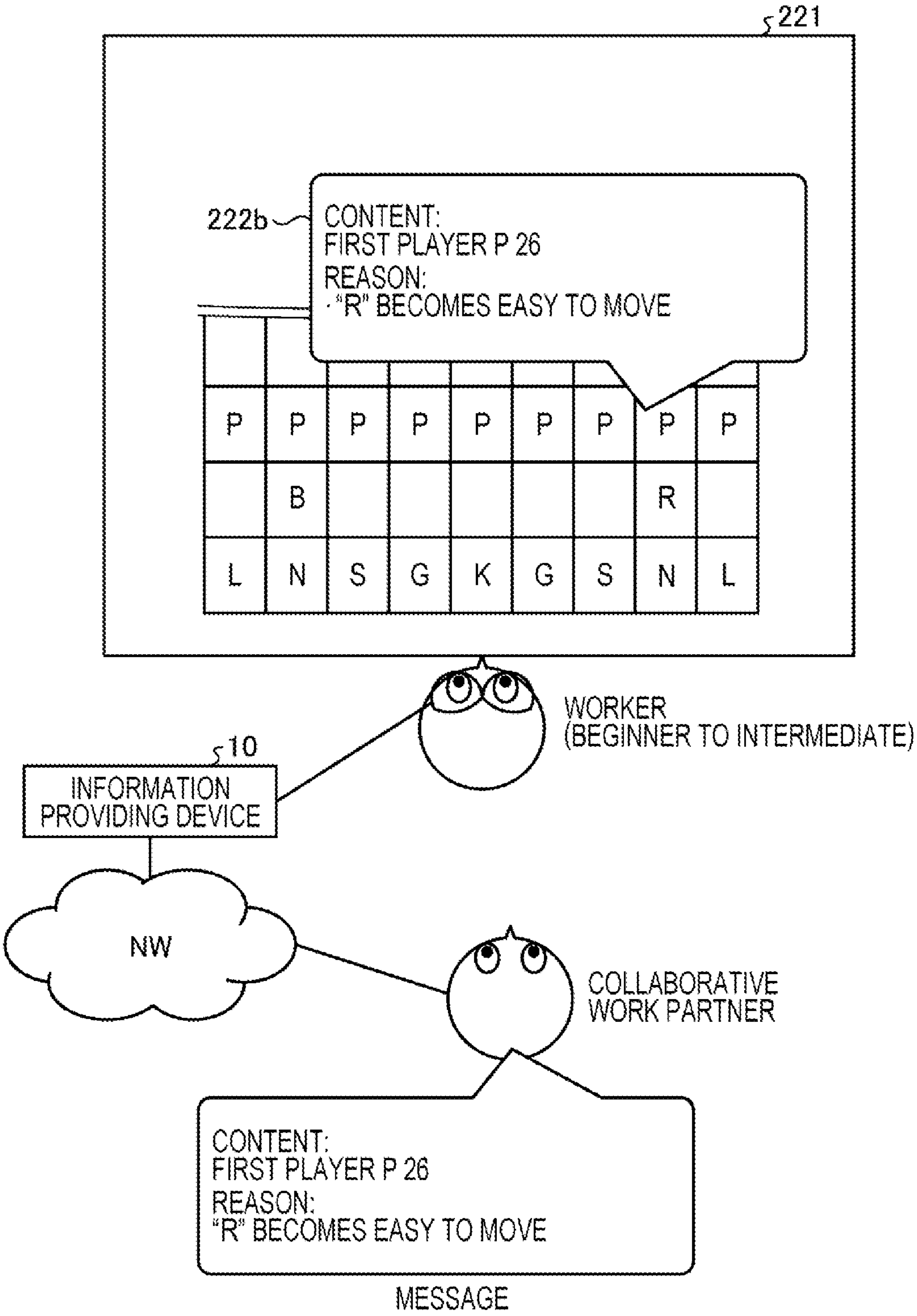
FIG. 2 is a diagram for explaining information presented by the information providing device.
Figure 3:
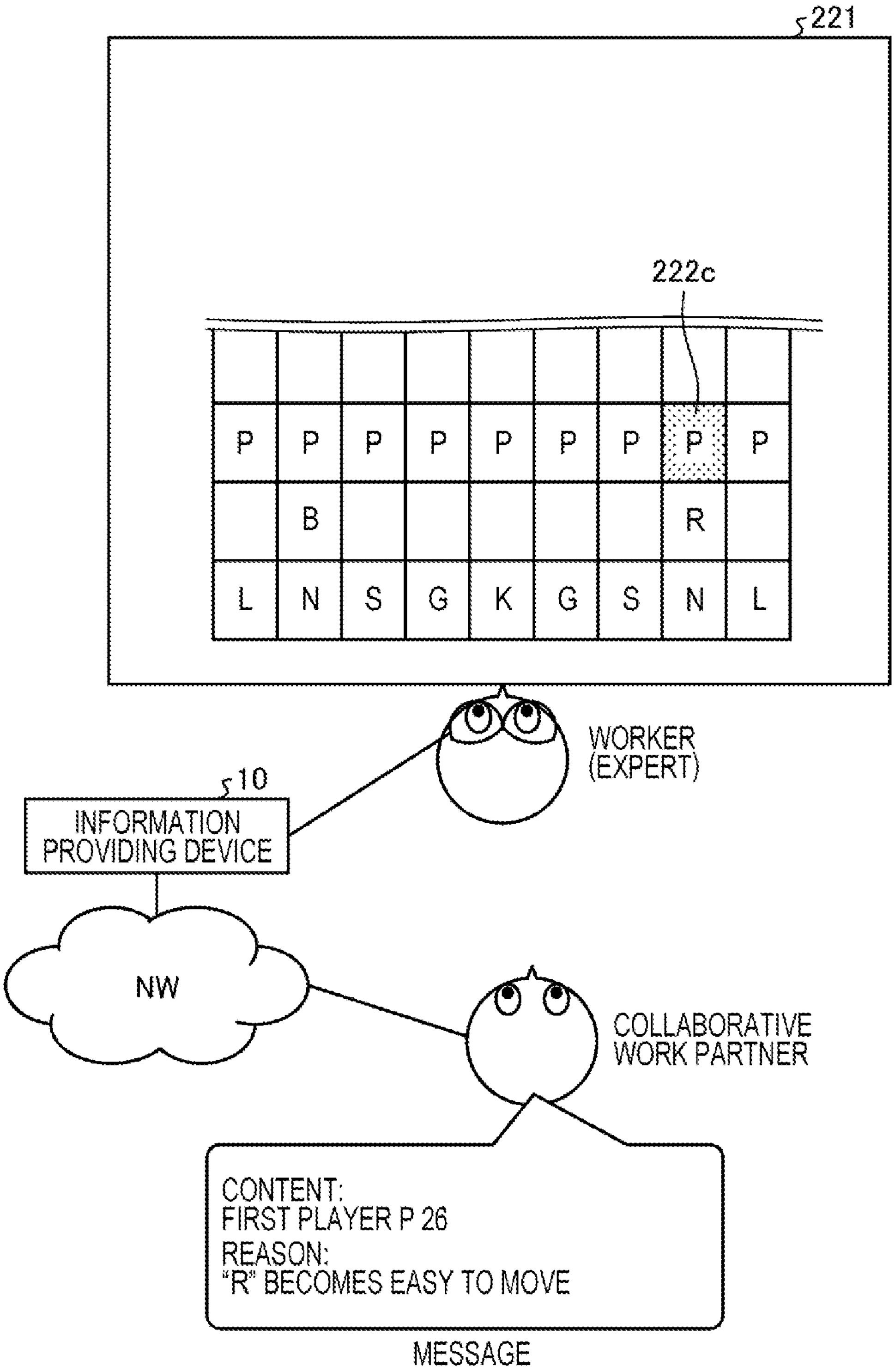
FIG. 3 is a diagram for explaining information presented by the information providing device.

FIGS. 1, 2, and 3 are diagrams for explaining information provided by an information providing device according to a first embodiment.

A worker in FIG. 1 is a user who performs work. A collaborative work partner is a user who performs the work together with the worker.

For example, the worker (operator) performs an operation in the work. On the other hand, the collaborative work partner (partner) provides information to the worker via an information providing device 10. The collaborative work partner provides the worker with an instruction for the work or advice on the work.

For example, the work is input work to an information device by using a mouse, a keyboard, a touch panel, and a joystick. In addition, the work may be an operation of a controller of an XR (AR, VR, or the like) device, a hand gesture input, or the like.

Further, the work may be playing a board game such as shogi. In the present embodiment, it is assumed that the work is to have a game of (play) shogi.

As illustrated in FIG. 1, the worker plays shogi while looking at a board surface. Here, it is assumed that the worker looks at the board surface through a screen 221 displayed on a display device such as VR goggles or a display or directly.

It is assumed that the worker and the collaborative work partner each use a terminal device. For example, the terminal device is a personal computer, a smartphone, a tablet terminal, or the like. The terminal device may be integrated with the information providing device.

The collaborative work partner transmits a message from the terminal device via a network (NW). The network is, for example, the Internet.

The message transmitted by the collaborative work partner is provided to the terminal device of the worker by the information providing device 10. At this time, it can be said that the information providing device 10 functions as an interface in information transmission between the worker and the collaborative work partner.

The information providing device 10 changes a format for presenting information according to a degree of skill of the worker for the work. For example, in a case where the degree of skill of the worker for the work is low, the information providing device 10 presents the information in a format that is intuitively easy to understand.

Here, the message transmitted by the collaborative work partner includes fixed phrases and non-fixed phrases. A fixed phrase is a sentence whose type is determined in advance. In addition, a non-fixed phrase is a freely written sentence.

In the example of FIG. 1, "Content" of the message corresponds to a fixed phrase. In addition, "Reason" of the message corresponds to a non-fixed phrase.

The collaborative work partner transmits a message "Content: First player P 26 Reason: "R" becomes easy to move".

"First player P 26" includes three portions of "First player" in a portion representing the first player or the second player, "26" representing a position on the board, and "P" representing a type of a piece. In each portion, character string possibilities are determined in advance, and combinations are finite, and thus, the information providing device 10 can easily interpret meaning of the fixed phrase.

The information providing device 10 displays visual information 222*a* on the screen 221. The information providing device 10 generates the visual information 222*a* on the basis of the message.

In the example of FIG. 1, the worker is a beginner, that is, the degree of skill of the worker for the work is low. For this reason, the information providing device 10 adds, to the visual information 222*a*, information to prompt understanding of the worker.

As illustrated in FIG. 1, the visual information 222*a* includes an image expressing a portion of "P 26". In addition, the visual information 222*a* includes a character string of "Reason: "R" becomes easy to move", which is a non-fixed phrase. Further, the visual information 222*a* includes a character string of "Supplement: "P" can move only one square forward" as supplementary information regarding "P".

As a result, the worker who is a beginner can understand intention of the message even in a case where the worker does not understand a position on the board meant by "P 26" and movement of a piece called "P".

FIG. 2 illustrates an example of the screen 221 in a case where the worker is a beginner to an intermediate, that is, the degree of skill of the worker for the work is medium.

As illustrated in FIG. 2, visual information 222*b* includes a character string representing the message as it is.

As a result, the worker who is a beginner to an intermediate can know the content of the message transmitted by the collaborative work partner without excess or deficiency by looking at the visual information 222*b*.

FIG. 3 illustrates an example of the screen 221 in a case where the worker is an expert, that is, the degree of skill of the worker for the work is high.

As illustrated in FIG. 3, visual information 222*c* highlights one square on the board surface. The visual information 222*c* highlights a part of the screen by a luminance, color, or pattern.

As a result, by looking at the visual information 222*c*, the worker who is an expert can perceive the intention of the message without looking at the message itself transmitted by the collaborative work partner.

The information providing device 10 automatically estimates the degree of skill of the worker for the work and presents the message in a format according to the estimated degree of skill. For this reason, the collaborative work partner can transmit the message without being conscious of the degree of skill of the worker.

Configuration of First Embodiment

Figure 4:
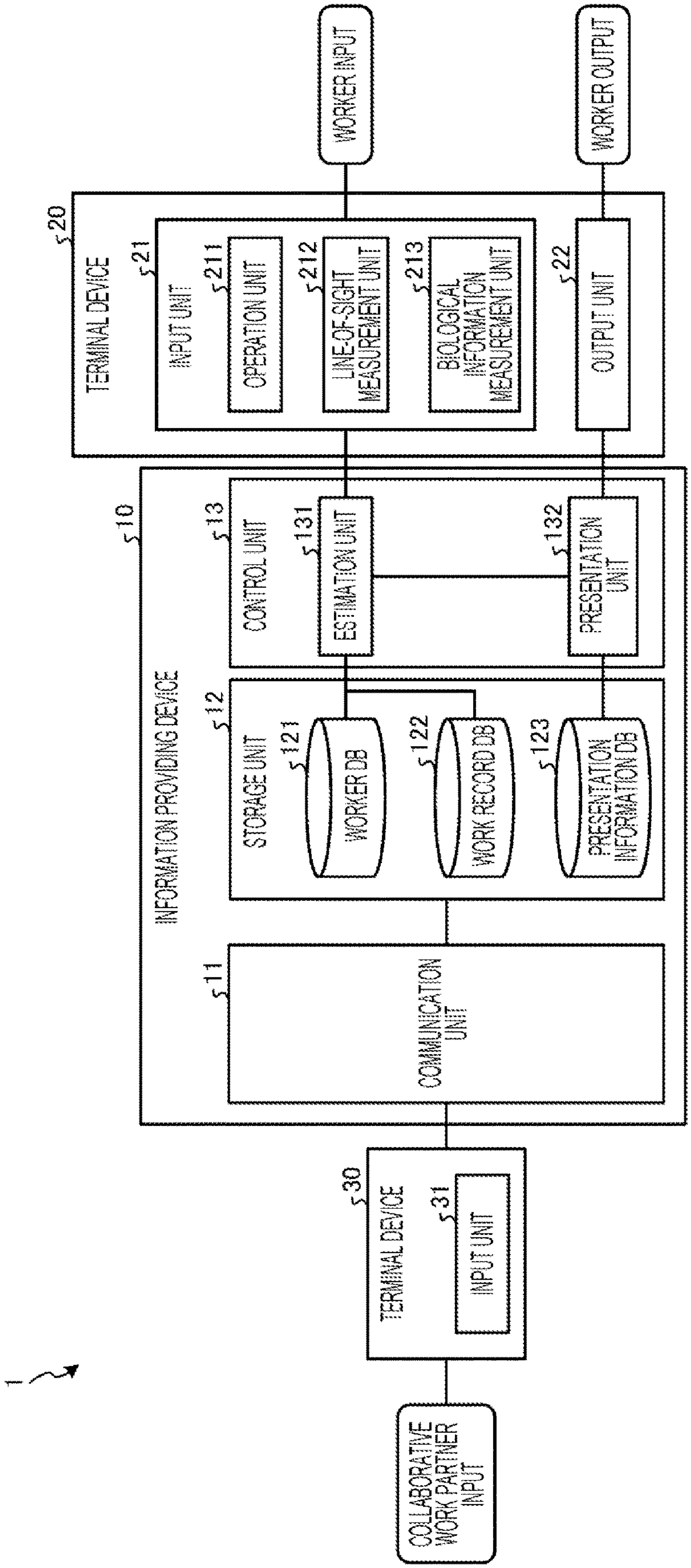
FIG. 4 is a diagram illustrating a configuration example of an information providing system according to a first embodiment.

FIG. 4 is a diagram illustrating a configuration example of an information providing system according to the first embodiment. As illustrated in FIG. 4, an information providing system 1 includes the information providing device 10, a terminal device 20, and a terminal device 30.

The terminal device 30 receives an input of a message by the collaborative work partner. The terminal device 30 transmits the input message to the information providing device 10.

The information providing device 10 estimates the degree of skill of the worker. In addition, the information providing device 10 transmits information based on the message received from the terminal device 30 to the terminal device 20 in a format according to the estimated degree of skill.

The terminal device 20 outputs the information received from the information providing device 10 to the worker.

Here, it is assumed that the work is shogi. In addition, the worker is a player of shogi. In addition, the collaborative work partner gives advice on shogi to the worker. In addition, the degree of skill estimated by the information providing device 10 is referred to as a recognized degree of skill.

As illustrated in FIG. 4, the information providing device 10 includes a communication unit 11, a storage unit 12, and a control unit 13.

The communication unit 11 performs data communication with other devices via a network. For example, the communication unit 11 is a network interface card (NIC).

The storage unit 12 is a storage device such as a hard disk drive (HDD), a solid state drive (SSD), or an optical disc. Note that the storage unit 12 may be a data-rewritable semiconductor memory such as a random access memory (RAM), a flash memory, or a non volatile static random access memory (NVSRAM).

The storage unit 12 stores an operating system (OS) and various programs executed by the information providing device 10. The storage unit 12 stores a worker DB 121, a work record DB 122, and a presentation information DB 123.

The worker DB 121 is information regarding workers. FIG. 5 is a diagram illustrating an example of the worker DB. As illustrated in FIG. 5, the worker DB 121 includes a worker ID, work experience, and a previous recognized-degree-of-skill estimated value.

The worker ID is an identifier indicating each of rows of the worker DB 121. The rows of the worker DB 121 correspond to the respective workers.

The work experience represents an amount of experience of the worker corresponding to the worker ID for the work. Here, the work experience is a time (unit: year) during which each worker performs the work.

The previous recognized-degree-of-skill estimated value is an average value of the recognized degree of skill estimated by the information providing device 10 when the worker performed the work one time before. The worker may perform similar work a plurality of times. In addition, the recognized degree of skill may be estimated a plurality of times in one time of work.

Note that $\alpha$ is a symbol representing the recognized degree of skill. In addition, a symbol with a bar immediately above $\alpha$ represents an average value of the recognized degree of skill. In addition, x has an initial value of 0 and changes in a range from 0 to 1.0.

For example, FIG. 5 illustrates that work experience of a worker with a worker ID "1" is one year, and the previous recognized-degree-of-skill estimated value is 0.

In addition, for example, FIG. 5 illustrates that work experience of a worker with a worker ID "2" is 10 years, and the previous recognized-degree-of-skill estimated value is 0.9.

The work record DB 122 is a record of the work of the worker. FIG. 6 is a diagram illustrating an example of the work record DB. As illustrated in FIG. 6, the work record DB 122 includes a work ID, a worker ID, a scene, a line-of-sight trajectory, an operation record, an operation time, and an evaluation value.

The work ID is an identifier indicating each of rows of the work record DB 122. The rows of the work record DB 122 correspond to respective pieces of work. The worker ID is an identifier for identifying the worker.

Although only one row is illustrated as an example in FIG. 6, the work record DB 122 stores a plurality of records of work. In addition, a worker whose work is stored in the work record DB 122 is not limited to a worker whose recognized degree of skill is to be estimated.

The work record DB 122 may be used as teacher data for performing learning of a model for calculating the recognized degree of skill.

The scene is information indicating a situation when the worker performs work. Here, the scene is an image of a board surface of shogi that is a work target.

The line-of-sight trajectory is a trajectory of line-of-sight movement of the worker looking at the situation for t' seconds from an arbitrary time.

The operation record is an operation performed by the worker on a situation indicated in the scene. The operation time is a time required for the operation indicated in the operation record.

The evaluation value is an evaluation value for the operation performed by the worker. For example, the evaluation value is calculated on the basis of the line-of-sight trajectory.

For example, the evaluation value increases as the operation increases a winning rate in shogi. In addition, the evaluation value may be calculated by an external evaluation tool.

Note that z' is a symbol representing an evaluation value. In addition, z' takes a value in a range from 0 to 1.0.

FIG. 6 illustrates that work with a work ID "1" is performed by a worker with a worker ID "3", the work record is "First player P 26", and the operation time is 128 seconds. In addition, FIG. 6 illustrates that the evaluation value of the work with the work ID "1" is "0.6".

The presentation information DB 123 is information regarding a format (presentation format) of information to be presented to the worker. FIG. 7 is a diagram illustrating an example of the presentation information DB. As illustrated in FIG. 7, the presentation information DB 123 includes an information ID, a corresponding recognized degree of skill, message information, a presentation format, and a presentation position.

The information providing device 10 generates a presentation format on the basis of a message from the collaborative work partner and stores the presentation format in the presentation information DB 123. In addition, the presentation format may be manually created in advance and stored in the presentation information DB 123.

The information ID is an identifier indicating each of rows of the presentation information DB 123. The corresponding recognized degree of skill is a range of values of the recognized degree of skill corresponding to each of presentation formats.

The message information is a portion corresponding to the fixed phrase in the message transmitted by the collaborative work partner. For example, the message information includes information regarding a work instruction.

The presentation format is a format generated according to the message information and the recognized degree of skill. The presentation position indicates a position at which information is presented. Here, the presentation position corresponds to a position on a board of shogi.

FIG. 7 illustrates an example of the presentation information DB 123 in a case where the message by the collaborative work partner is "Content: First player P 26 Reason: "R" becomes easy to move" illustrated in FIG. 1 and the like. Details of a method of generating the presentation format will be described later.

The control unit 13 controls the entire information providing device 10. The control unit 13 is, for example, an electronic circuit such as a central processing unit (CPU), a micro processing unit (MPU), or a graphics processing unit (GPU), or an integrated circuit such as an application specific integrated circuit (ASIC) or a field programmable gate array (FPGA).

In addition, the control unit 13 includes an internal memory for storing programs or control data defining various processing procedures, and executes each type of processing using the internal memory. In addition, the control unit 13 functions as various processing units by operation of various programs. For example, the control unit 13 includes an estimation unit 131 and a presentation unit 132.

The estimation unit 131 estimates the recognized degree of skill of the user for the work on the basis of first information that is information for specifying a situation in the work and second information that is information regarding the user who performs the work.

The user who performs the work is a worker. In addition, for example, the first information is the scene of the work record DB 122 illustrated in FIG. 6. In addition, for example, the second information is the line-of-sight trajectory of the work record DB 122 illustrated in FIG. 6.

For example, the estimation unit 131 uses a trajectory of a line of sight of the user in the work as the second information to estimate the recognized degree of skill of the user for the work.

In addition, the estimation unit 131 can estimate the recognized degree of skill of the user for the work by using at least one of a motion of the user, a history of operation by the user in the work, or biological information of the user as the second information.

For example, the motion of the user is, for example, the line-of-sight trajectory of the work record DB 122. In addition, for example, the history of the operation is the operation record and the operation time in the work record DB 122. In addition, for example, the biological information of the user is vital signs such as a body temperature, a heartbeat, and a pupil of the worker.

The presentation unit 132 presents information regarding the work to the user in a format according to the recognized degree of skill estimated by the estimation unit 131.

For example, the presentation unit 132 presents a message to the worker by using any one of the presentation formats illustrated in FIG. 7.

A configuration of the terminal device 20 will be described. As illustrated in FIG. 4, the terminal device 20 includes an input unit 21 and an output unit 22.

The input unit 21 receives an input of data. The input unit 21 includes an operation unit 211, a line-of-sight measurement unit 212, and a biological information measurement unit 213.

The operation unit 211 is a device for a worker to perform an operation. For example, the operation unit 211 is a mouse, a keyboard, a touch panel, a joystick, a controller of an XR device, a sensor that recognizes a hand gesture, or the like.

The line-of-sight measurement unit 212 is a device for measuring a line of sight of the worker. For example, the line-of-sight measurement unit 212 is an eye tracker.

The biological information measurement unit 213 is a device for measuring biological information of the worker. For example, the biological information measurement unit 213 is a wearable device worn by the worker.

The output unit 22 is a device for outputting information provided by the information providing device 10. For example, the output unit 22 is a display that displays a screen.

Figure 8:
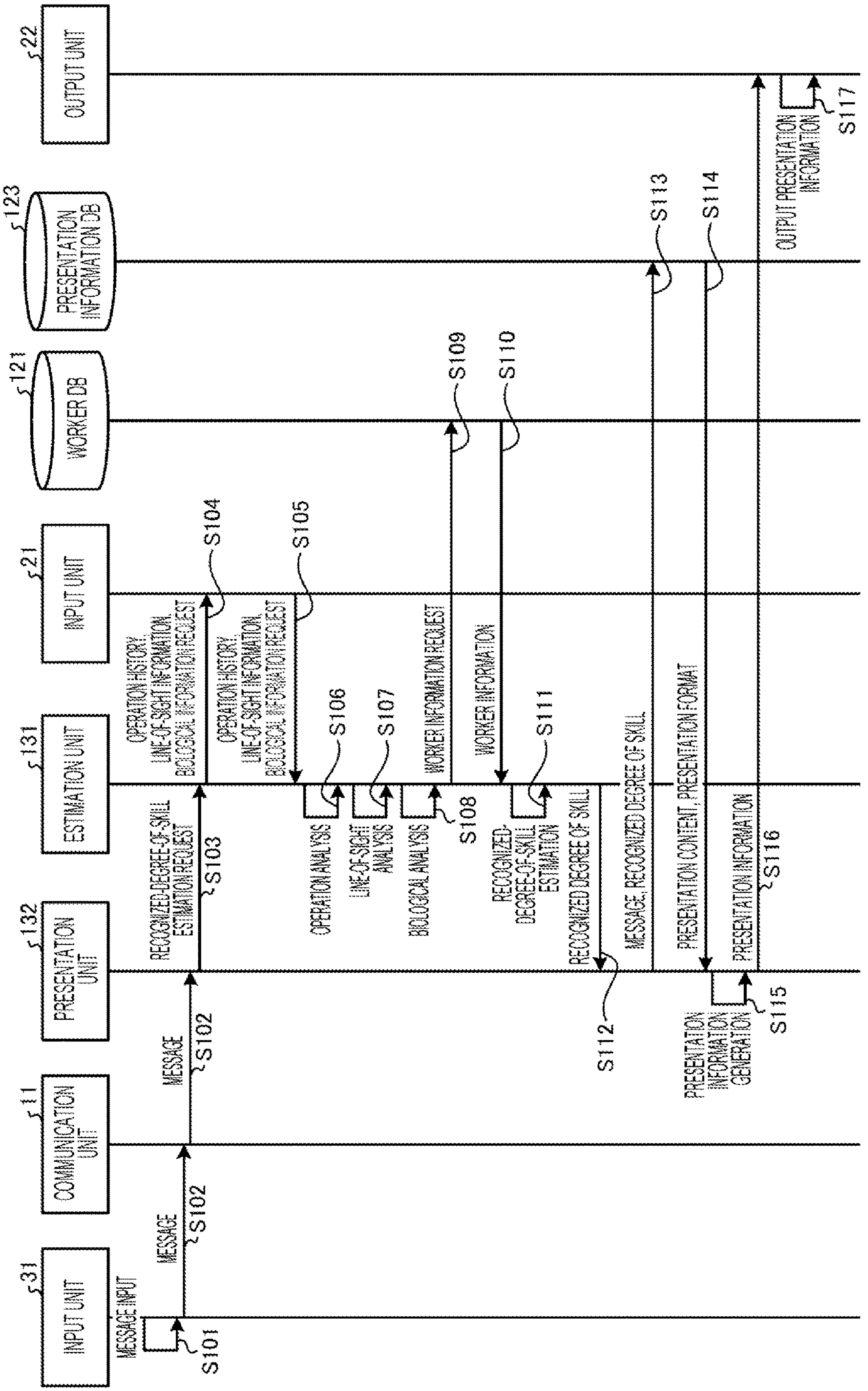
FIG. 8 is a sequence diagram illustrating a flow of processing performed by the information providing system according to the first embodiment.

A flow of processing performed by each unit including the estimation unit 131 and the presentation unit 132 will be described with reference to FIG. 8. FIG. 8 is a sequence diagram illustrating a flow of processing performed by the information providing system according to the first embodiment.

As illustrated in FIG. 8, first, an input unit 31 of the terminal device 30 receives an input of a message from the collaborative work partner (step S101).

The message input to the input unit 31 is transmitted to the presentation unit 132 via the communication unit 11 of the information providing device 10 (step S102).

Here, the presentation unit 132 requests the estimation unit 131 to estimate the recognized degree of skill (step S103). The estimation unit 131 requests the input unit 21 of the terminal device 20 for an operation history, line-of-sight information, and biological information of the worker (step S104), and acquires these pieces of information (step S105).

Then, the estimation unit 131 performs analysis of the operation information, the line-of-sight information, and the biological information (operation analysis, line-of-sight analysis, biological analysis) (steps S106, S107, and S108).

For example, in the operation analysis, the line-of-sight analysis, and the biological analysis, the estimation unit 131 converts the acquired information into a format that can be used in recognized-degree-of-skill estimation.

Further, the estimation unit 131 requests the worker DB 121 for worker information (step S109), and acquires the worker information (step S110).

Subsequently, the estimation unit 131 estimates the recognized degree of skill of the worker by using the acquired various types of information (step S111).

Thereafter, the presentation unit 132 acquires the recognized degree of skill estimated by the estimation unit 131 (step S112), and acquires a presentation content and a presentation format according to the message and the recognized degree of skill from the presentation information DB 123 (steps S113 and S114). The presentation content is, for example, the message information in the presentation information DB 123.

The presentation unit 132 generates presentation information on the basis of the acquired presentation content and presentation format (step S115). Then, the presentation unit 132 causes the output unit 22 of the terminal device 20 to output the generated presentation information (steps S116 and S117).

EXAMPLE

An example in a case where the work is shogi will be specifically described. The estimation unit 131 inputs a scene s' and a line-of-sight trajectory x(t) to a model (estimator) and calculates an evaluation value. The model is, for example, a deep neural network.

It is assumed that the model has been learned by using the work record DB 122 as teacher data. That is, learning of the model is performed by using teacher data with the scene (board surface of shogi) s' of each of all the workers stored in the work record DB 122 and the line-of-sight trajectory x(t) at that time as inputs (explanatory variables) and an evaluation value z' of an operation performed (one move played) by each worker thereafter as an output (objective variable). For example, the evaluation value in learning increases as a record (winning rate) that is a result of the operation increases.

As described above, the estimation unit 131 estimates the recognized degree of skill of the user on the basis of the evaluation value obtained by inputting information that specifies the operation based on the first information (for example, the scene) and the second information (for example, the trajectory of the line of sight) to the learned model.

The estimation unit 131 calculates a recognized degree of skill $\alpha_i$ by Formula (1).

[Math. 1]

$$\alpha_i = \begin{pmatrix} w_1 m^{-a} & w_2 \ln m & w_3 f(m) & w_4 f(m) \end{pmatrix} \begin{pmatrix} z_i(s_i, x_i(t)) \\ \overline{\alpha} \\ \dfrac{1}{T_i(\tau)} \\ \dfrac{1}{b_i(t)} \end{pmatrix} \tag{1}$$

$$T_i(\tau) = \frac{1}{i} \sum_0^i \tau_n$$

A symbol i is a subscript indicating the number of moves from the start of a game of shogi. A symbol $s_i$ is a board surface of the i-th move from the start of the game of shogi. A symbol $x_i(t)$ is a trajectory of line-of-sight movement for t' seconds starting from an arbitrary time t at $s_i$. Note that the trajectory $x_i(t)$ may be information representing a position or direction of the line of sight at each time, or may be information representing an amount of movement of the trajectory of the line of sight. In addition, the trajectory $x_i(t)$ may be information representing a location on the board surface where the line of sight has stayed for a certain period of time or more. In addition, the trajectory $x_i(t)$ may be information representing the trajectory of the line of sight as a pattern.

A symbol $z_i(s_i, x_i(t))$ is an evaluation value output from a learned model using $s_i$ and $x_i(t)$ as inputs.

A symbol with a bar immediately above α is an average value of the recognized degree of skill $\alpha_i$ when the worker who has performed the work by using the system a plurality of times performed the previous work.

A symbol $b_i(t)$ is a stress value estimated from biological information (for example, skin potential and heartbeat) for t' seconds starting from an arbitrary time t at $s_i$. The stress value may be calculated by an existing calculation method.

A symbol τn is a time taken by the worker to play one move of the n-th move. A symbol $T_i(t)$ is an average of times taken by the worker up to the i-th move.

A symbol f(m) is a function of the standard normal distribution having work experience m as a variable. Symbols $w_1$, $w_2$, $w_3$, and we are weighting coefficients to satisfy $0 \leq \alpha_i \leq 1$. A symbol a is a constant.

Here, the right side of Formula (1) is a product of a row vector and a column vector. Elements of the row vector functions as weights to respective elements of the column vector.

First, the estimation unit 131 calculates a first value (an element $z_i(s_i, x_i(t))$ of the column vector) based on the motion at the time t, a second value (an element $1/T_i(\tau)$ of the column vector) based on the history at the time t, and a third value (an element $1/b_i(t)$ of the column vector) based on the biological information at a predetermined time.

In addition, the estimation unit 131 acquires a fourth value (α (with a bar immediately above) of the column vector) that is the recognized degree of skill of the user for the work estimated at the time before the time t.

Note that the estimation unit 131 can use a reciprocal of a measured value and a normalized measured value for estimation of the recognized degree of skill, instead of using the measured value as it is acquired from the terminal device 20 or the like.

An element $w_1 m^{-a}$ of the row vector increases as the work experience m decreases. In addition, an element $w_2 \ln m$ of the row vector decreases as the work experience m decreases.

For this reason, in the product of the row vector and the column vector, influence of the first value increases and influence of the fourth value decreases as the amount of experience on the work of the user is smaller.

An element $w_3 f(m)$ of the row vector increases as the work experience m is closer to the average value of the standard normal distribution. In addition, an element $w_4 f(m)$ of the row vector increases as the work experience m is closer to the average value of the standard normal distribution. Note that the work experience m may have been standardized in accordance with the standard normal distribution.

For this reason, in the product of the row vector and the column vector, influence of the second value and the third value increases as the amount of experience of the user for the work is closer to a predetermined average value.

As described above, the estimation unit 131 controls the influence when the product of the row vector and the column vector is obtained, and then estimates the recognized degree of skill of the user for the work on the basis of the first value, the second value, the third value, and the fourth value.

The estimation unit 131 may estimate the recognized degree of skill by using one or two of the first value, the second value, and the third value excluding the fourth value among the elements of the column vector. For example, the estimation unit 131 may estimate the recognized degree of skill only from the first value, or may estimate the recognized degree of skill by using a column vector having only the first value and the second value as elements.

Note that the estimation unit 131 may estimate the recognized degree of skill only from information acquired during the work.

For example, the estimation unit 131 can calculate the recognized degree of skill $\alpha_i$ on the basis of an amount of movement l(t) of the line of sight per unit time as in Formula (2). Note that, in Formula (2), the average value of the recognized degree of skill in the past is not used, but the biological information and the operation history acquired during the work are used.

[Math. 2]

$$\alpha_i = 1.0 - \left( w_5 \int_0^{t''} l(t)dt + w_6 b_i(t) + w_7 T_i(\tau) \right) \tag{2}$$

Meaning of each symbol in Formula (2) is the same as that in Formula (1). Symbols $w_5$, $w_6$, and $w_7$ are weighting coefficients to satisfy $0 \leq \alpha_i \leq 1$.

The presentation unit 132 displays a character string and an image indicating the information regarding the work in a display area of a device used by the user in a case where the recognized degree of skill estimated by the estimation unit 131 is less than a first threshold, displays the character string indicating the information in the display area in a case where the recognized degree of skill is greater than or equal to the first threshold and is less than a second threshold greater than the first threshold, and highlights a part of the display area according to the information in a case where the recognized degree of skill is greater than or equal to the second threshold. Note that the display area is, for example, the screen 221.

Here, the first threshold is, for example, 0.3. The presentation unit 132 refers to the presentation information DB 123, and in a case where the estimated value of the recognized degree of skill is greater than or equal to 0 and less than 0.3, displays the visual information **222*a* including the image and the character string as illustrated in FIG. 1 on the screen 221 output by the output unit 22**.

In addition, the second threshold is, for example, 0.6. The presentation unit 132 refers to the presentation information DB 123, and in a case where the estimated value of the recognized degree of skill is greater than or equal to 0.3 and less than 0.6, displays the visual information **222*b* including the character string as illustrated in FIG. 2 on the screen 221 output by the output unit 22**.

In addition, the presentation unit 132 refers to the presentation information DB 123, and in a case where the estimated value of the recognized degree of skill is greater than or equal to 0.6, displays the visual information **222*c* including only highlight display as illustrated in FIG. 3 on the screen 221 output by the output unit 22**.

Note that the presentation unit 132 may generate each piece of visual information as an image and transmit the generated image to the terminal device 20. The terminal device 20 superimposes and displays the received image on the screen 221.

In addition, in the present embodiment, a display mode of the visual information is classified into three stages by two thresholds of the first threshold and the second threshold. On the other hand, the number of thresholds is not limited to two, and may be any positive integer according to a target task and work. At that time, the display mode of the visual information is classified into stages of which the number of the stages is obtained by adding one to the number of thresholds.

In addition, the terminal device 20 may be all-in-one type AR glasses. In this case, the worker can look at a real shogi board through a display area of the AR glasses. In addition, the screen 221 in the present embodiment is replaced with the display area of the AR glasses. Then, the presentation unit 132 projects the visual information on the real shogi board that can be looked at from the display area by an AR function, and superimposes and displays the visual information.

The output unit 22 may be a projector. In this case, the input unit 21 may be a device such as a line-of-sight measurement device, a smart watch, a mouse, or a smartphone.

For example, the output unit 22 projects the screen 221 including the shogi board, shogi pieces, and the visual information on a desk and on a screen. At that time, the worker can look at a projected image without wearing a device such as the AR glasses.

In addition, the terminal device 20 may be a combination of an input device such as a line-of-sight measurement device, a smart watch, a mouse, or a smartphone and a display device such as a projector or a display. In addition, the terminal device 20 may be a display device such as a projector or a display including an input device.

Processing in First Embodiment

Figure 9:
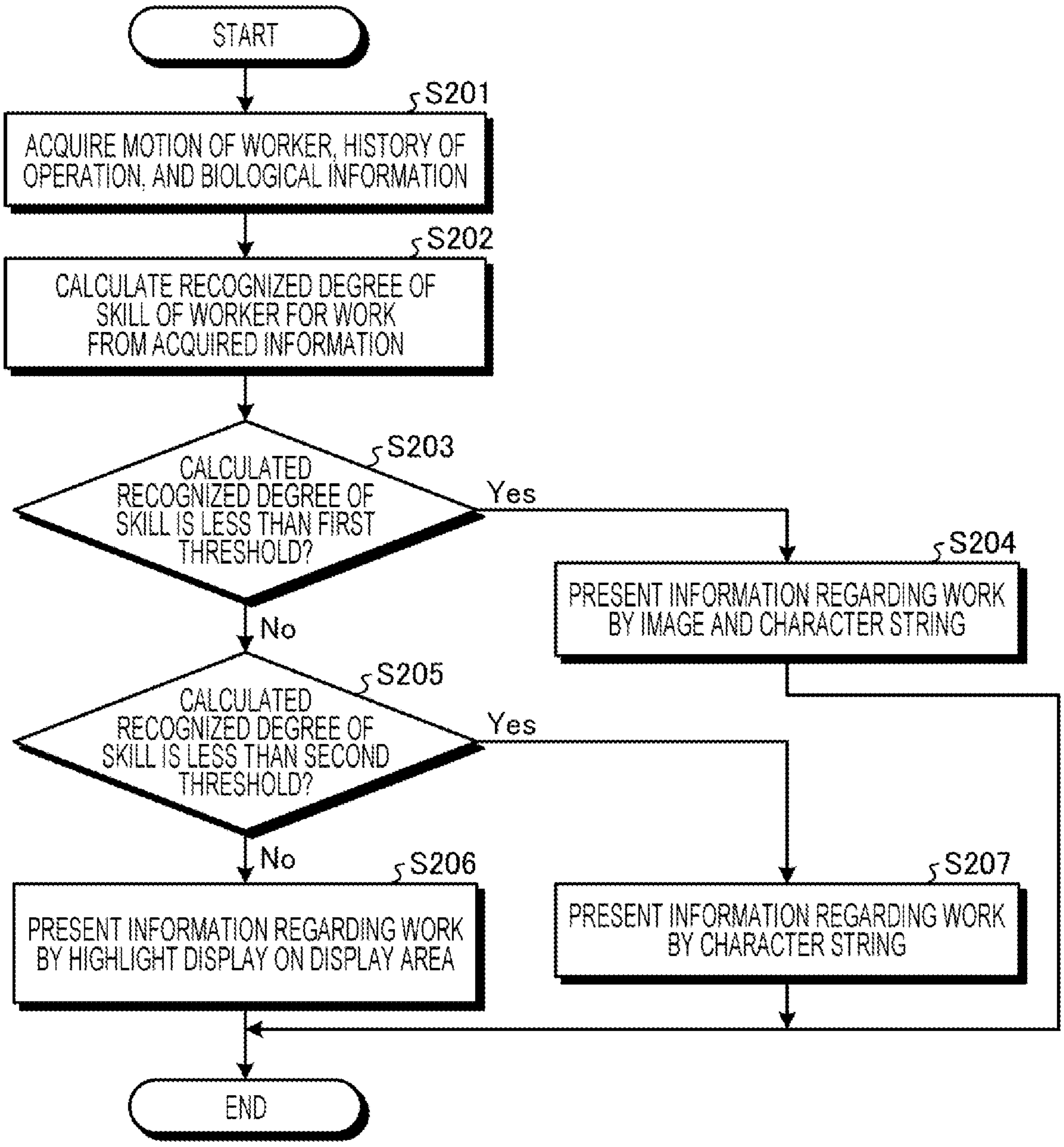
FIG. 9 is a flowchart illustrating a flow of processing performed by an information providing device according to the first embodiment.

A flow of processing performed by the information providing device 10 will be described with reference to FIG. 9. FIG. 9 is a flowchart illustrating a flow of processing performed by the information providing device according to the first embodiment.

As illustrated in FIG. 9, first, the information providing device 10 acquires a motion of the worker, a history of operation, and biological information (step S201). The information providing device 10 can acquire each piece of information from the terminal device 20 or the storage unit 12.

Next, the information providing device 10 calculates the recognized degree of skill of the worker for the work from the acquired information (step S202). For example, the information providing device 10 calculates the recognized degree of skill by Formula (1).

In a case where the calculated recognized degree of skill is less than the first threshold (step S203, Yes), the information providing device 10 presents information regarding the work by an image and a character string (step S204). For example, the information providing device 10 presents the information by the visual information 222*a* of FIG. 1.

In a case where the calculated recognized degree of skill is not less than the first threshold (step S203, No), the information providing device 10 proceeds to step S205.

In a case where the calculated recognized degree of skill is not less than the second threshold (step S205, No), the information providing device 10 presents the information regarding the work by highlight display on the display area (step S206). For example, the information providing device 10 presents the information by the visual information 222*c* of FIG. 3. In addition, the display area here may be a screen of a display or a display area of AR goggles.

In a case where the calculated recognized degree of skill is less than the second threshold (step S205, Yes), the information providing device 10 presents the information regarding the work by the character string (step S207). For example, the information providing device 10 presents the information by the visual information 222*b* in FIG. 2. Note that the second threshold is greater than the first threshold.

Effects of First Embodiment

The estimation unit 131 estimates the degree of skill of the user for the work on the basis of first information that is information for specifying the situation in the work and the second information that is information regarding the user who performs the work. The presentation unit 132 presents the information regarding the work to the user in a format according to the degree of skill estimated by the estimation unit 131.

The information providing device 10 can automatically estimate the degree of skill of the user (worker) who performs work for the work in real time. As a result, according to the first embodiment, the information regarding the intellectual work can be presented in a format suitable for the user.

Further, even in a case where the worker performs the work for which the degree of skill is to be estimated by the information providing device 10 for the first time or in a case where the degree of skill of the user is improved in the work for which the degree of skill is not to be estimated by the information providing device 10, the information providing device 10 can estimate the degree of skill from information during the work acquired in real time.

The estimation unit 131 uses the trajectory of the line of sight of the user in the work as the second information to estimate the degree of skill of the user for the work. As a result, it is possible to collect information necessary for estimating the degree of skill without interfering with the work of the worker.

The estimation unit 131 uses at least one of the motion of the user, the history of the operation by the user in the work, or the biological information of the user as the second information to estimate the degree of skill of the user for the work. As described above, accuracy of degree-of-skill estimation can be improved by using the information collected from a plurality of viewpoints.

The estimation unit 131 calculates the first value based on the motion at the predetermined time, the second value based on the history at the predetermined time, and the third value based on the biological information at the predetermined time, acquires the fourth value that is the degree of skill of the user for the work estimated at a second time before the predetermined time, and estimates the degree of skill of the user for the work on the basis of the first value, the second value, the third value, and the fourth value such that the influence of the first value increases and the influence of the fourth value decreases as the amount of experience of the user for the work is smaller, and the influence of the second value and the third value increases as the amount of experience of the user for the work is closer to the predetermined average value.

As a result, it is possible to flexibly adjust which element is viewed as important according to the amount of experience of the worker, and thus, it is possible to improve the accuracy of the degree-of-skill estimation.

The presentation unit 132 displays the character string and the image indicating the information regarding the work in the display area of the device used by the user in a case where the degree of skill estimated by the estimation unit 131 is less than the first threshold, displays the character string indicating the information in the display area in a case where the degree of skill is greater than or equal to the first threshold and is less than the second threshold greater than the first threshold, and highlights a part of the display area according to the information in a case where the degree of skill is greater than or equal to the second threshold.

As a result, beginners are allowed to intuitively understand information with an image. On the other hand, it is possible not to give extra information to experts and not to disturb the work.

The estimation unit 131 estimates the degree of skill of the user on the basis of the evaluation value obtained by inputting the information that specifies the operation based on the first information and the second information to the learned model. As a result, it is possible to accurately estimate the degree of skill on the basis of the tendencies of a large number of workers.

Other Examples

Not limited to shogi, the first embodiment can also be applied to input work to an information device using a mouse, a keyboard, a touch panel, and a joystick, an operation of a controller of an XR device, a hand gesture input, and the like.

Further, the first embodiment can also be applied to work of handling documents and languages (for example, operator response at a call center or the like), and the like, in addition to the intellectual work accompanied by operation of a device.

In addition, the second information is not limited to the trajectory of the line of sight. For example, the second information may be mouse movement, controller movement of XR equipment, movement of a hand of a hand gesture input, movement of a joystick, cursor movement in an operation using a keyboard, a trajectory of head movement, reading response speed and accuracy, and the like.

[System Configuration and Others]

In addition, each component of each illustrated device is functionally conceptual, and does not necessarily need to be physically configured as illustrated. That is, a specific form of distribution and integration of the devices is not limited to the illustrated form, and all or some of the devices can be functionally or physically distributed or integrated in any unit, according to various loads, usage conditions, and the like. Further, all or any part of each processing function performed in each device can be implemented by a central processing unit (CPU) and a program analyzed and executed by the CPU, or can be implemented as hardware by wired logic. Note that the program may be executed not only by a CPU but also by another processor such as a GPU.

In addition, among the pieces of processing described in the embodiment, all or some of the pieces of processing described as being automatically performed can be manually performed, or all or some of the pieces of processing described as being manually performed can be automatically performed by a known method. In addition, the processing procedures, the control procedures, the specific names, and the information including various kinds of data and parameters described in the above description and drawings can be arbitrarily changed, unless otherwise specified.

[Program]

As an embodiment, the information providing device 10 can be implemented by installing, on a desired computer, an information providing program for executing information providing processing described above as packaged software or online software. For example, by causing an information processing device to execute the information providing program described above, it is possible to cause the information processing device to function as the information providing device 10. The information processing device mentioned here includes a desktop or a laptop personal computer. In addition, the information processing device includes mobile communication terminals such as a smartphone, a mobile phone, and a personal handyphone system (PHS), xR devices such as all-in-one type AR glasses and VR goggles, and slate terminals such as a personal digital assistant (PDA) and a tablet terminal.

In addition, the information providing device 10 can also be implemented as an information providing server device that sets a terminal device used by a user as a client and provides the client with a service related to the information providing processing described above. For example, the information providing server device is implemented as a server device that provides an information providing service in which information regarding work and a user is an input and information displayed in a format according to the degree of skill is an output. In this case, the information providing server device may be implemented as a Web server, or may be implemented as a cloud that provides a service related to the information providing processing described above by outsourcing.

Figure 10:
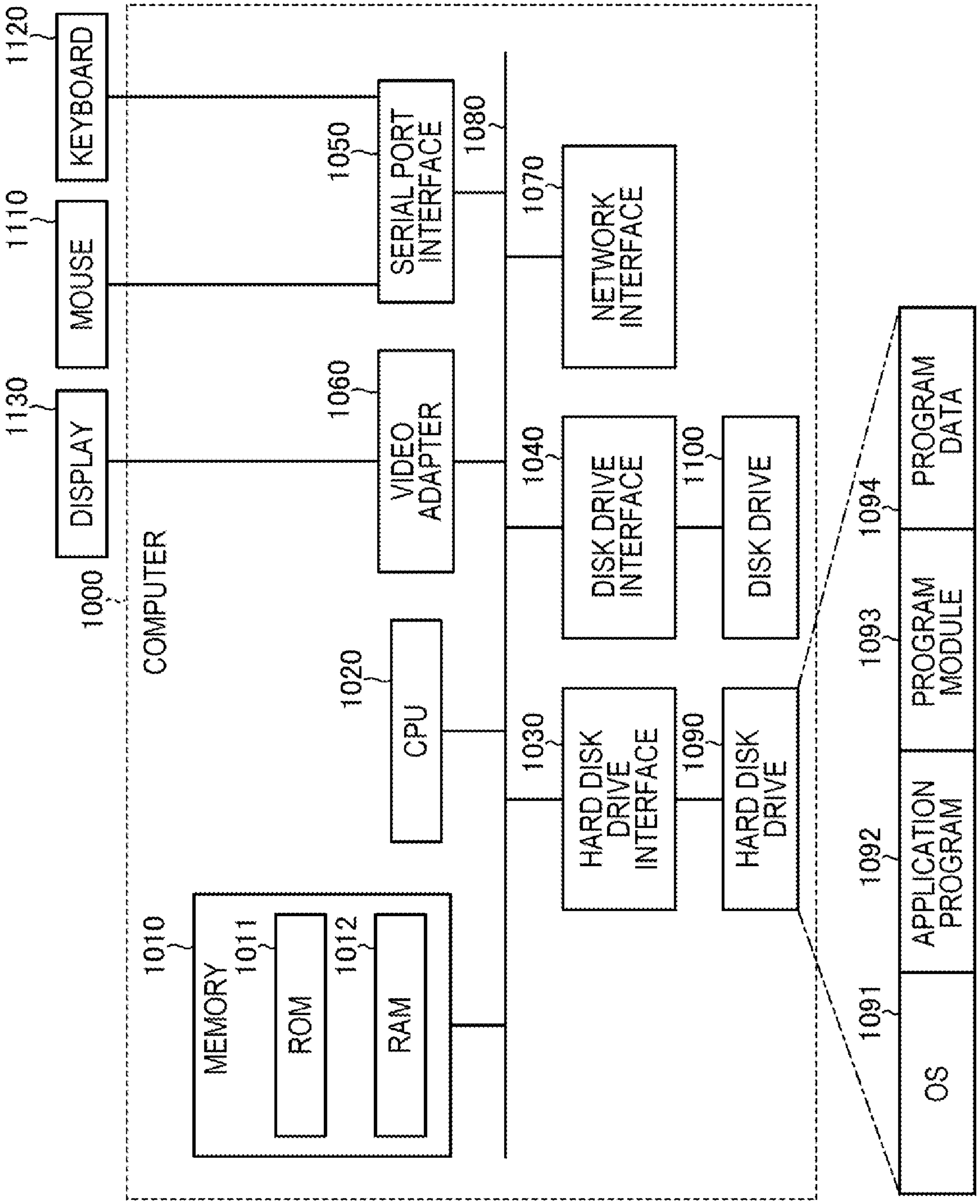
FIG. 10 is a diagram illustrating an example of a computer that executes an information providing program.

FIG. 10 is a diagram illustrating an example of a computer that executes the information providing program. A computer 1000 includes a memory 1010 and a CPU 1020, for example. In addition, the computer 1000 includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to a mouse 1110 and a keyboard 1120, for example. The video adapter 1060 is connected to, for example, a display 1130.

The hard disk drive 1090 stores an OS 1091, an application program 1092, a program module 1093, and program data 1094, for example. That is, the program that defines each piece of processing performed by the information providing device 10 is implemented as the program module 1093 in which codes executable by a computer are described. The program module 1093 is stored in, for example, the hard disk drive 1090. For example, the program module 1093 for executing processing similar to the functional configuration in the information providing device 10 is stored in the hard disk drive 1090. Note that the hard disk drive 1090 may be replaced with a solid state drive (SSD).

In addition, setting data used in the processing in the above-described embodiment is stored, for example, in the memory 1010 or the hard disk drive 1090 as the program data 1094. Then, the CPU 1020 reads the program module 1093 and the program data 1094 stored in the memory 1010 and the hard disk drive 1090 to the RAM 1012 as necessary, and executes the processing in the above-described embodiment.

Note that the program module 1093 and the program data 1094 are not limited to being stored in the hard disk drive 1090 and may be stored in, for example, a removable storage medium and be read by the CPU 1020 via the disk drive 1100 or the like. Alternatively, the program module 1093 and the program data 1094 may be stored in another computer connected via a network (a local area network (LAN), a wide area network (WAN), or the like). Then, the program module 1093 and the program data 1094 may be read by the CPU 1020 from the other computer via the network interface 1070.

REFERENCE SIGNS LIST

1 Information providing system
10 Information providing device
11 Communication unit
12 Storage unit
13 Control unit
20, 30 Terminal device
21, 31 Input unit
22 Output unit
121 Worker DB
122 Work record DB
123 Presentation information DB
211 Operation unit
212 Line-of-sight measurement unit
213 Biological information measurement unit

The invention claimed is:

1. An information providing device comprising:
a processor configured to execute operations comprising:
estimating a degree of skill of a user for work on a basis of first information that is information for specifying a situation in the work and second information that is information regarding the user performing the work; and
presenting information regarding the work to the user in a format according to the degree of skill estimated, wherein
the presenting further comprises displaying a character string and an image indicating information regarding the work in a display area of a device used by the user in a case where the degree of skill estimated is less than a first threshold,
displaying the character string indicating the information in the display area in a case where the degree of skill is greater than or equal to the first threshold and is less than a second threshold greater than the first threshold, and
highlights a part of the display area according to the information in a case where the degree of skill is greater than or equal to the second threshold.

2. The information providing device according to claim 1, wherein the estimating further comprises estimating the degree of skill of the user for the work by using a trajectory of a line of sight of the user in the work as the second information.

3. The information providing device according to claim 2, wherein the estimating further comprises inputting a scene and the trajectory of the line of sight and calculates an evaluation value using a deep neural network model.

4. The information providing device according to claim 1, wherein the estimating further comprises estimating the degree of skill of the user for the work by using at least one of a motion of the user, a history of an operation by the user in the work, or biological information of the user as the second information.

5. The information providing device according to claim 4, wherein
the estimating further comprises:
calculating a first value based on the motion at a predetermined time, a second value based on the history at the predetermined time, and a third value based on the biological information at the predetermined time,
acquiring a fourth value that is the degree of skill of the user for the work estimated at a time before the predetermined time, and
estimating the degree of skill of the user for the work on a basis of the first value, the second value, the third value, and the fourth value such that
influence of the first value increases and influence of the fourth value decreases as an amount of experience of the user for the work is smaller, and
influence of the second value and the third value increases as the amount of experience of the user for the work is closer to a predetermined average value.

6. The information providing device according to claim 1, wherein the estimating further comprises estimating the degree of skill of the user on a basis of an evaluation value obtained by inputting the first information and the second information to a learned model.

7. The information providing device according to claim 1, wherein the work comprising intellectual work and is presented in a format suitable to the user.

8. An computer-implemented method for providing information,
comprising:
an estimation step of estimating a degree of skill of a user for work on a basis of first information that is information for specifying a situation in the work and second information that is information regarding the user performing the work; and
a presentation step of presenting information regarding the work to the user in a format according to the degree of skill estimated by the estimation step, wherein
the presenting further comprises displaying a character string and an image indicating information regarding the work in a display area of a device used by the user in a case where the degree of skill estimated is less than a first threshold,
displaying the character string indicating the information in the display area in a case where the degree of skill is greater than or equal to the first threshold and is less than a second threshold greater than the first threshold, and
highlights a part of the display area according to the information in a case where the degree of skill is greater than or equal to the second threshold.

9. The computer-implemented method according to claim 8, wherein the degree of skill of the user for the work is estimated by using a trajectory of a line of sight of the user in the work as the second information.

10. The computer-implemented method according to claim 8, wherein the degree of skill of the user for the work is estimated by using at least one of a motion of the user, a history of an operation by the user in the work, or biological information of the user as the second information.

11. The computer-implemented method according to claim 10, wherein a first value is calculated based on the motion at a predetermined time, a second value based on the history at the predetermined time, and a third value based on the biological information at the predetermined time, a fourth value that is the degree of skill of the user for the work is acquired estimated at a time before the predetermined time, and the degree of skill of the user for the work is estimated on a basis of the first value, the second value, the third value, and the fourth value such that influence of the first value increases and influence of the fourth value decreases as an amount of experience of the user for the work is smaller, and influence of the second value and the third value increases as the amount of experience of the user for the work is closer to a predetermined average value.

12. The computer-implemented method according to claim 8, wherein the estimating further comprises estimating the degree of skill of the user on a basis of an evaluation value obtained by inputting the first information and the second information to a learned model.

13. A computer-readable non-transitory recording medium storing computer-executable program instructions that when executed by a processor cause a computer to execute an information providing program generation method comprising:

an estimation step of estimating a degree of skill of a user for work on a basis of first information that is information for specifying a situation in the work and second information that is information regarding the user performing the work; and a presentation step of presenting information regarding the work to the user in a format according to the degree of skill estimated by the estimation step, wherein the presenting further comprises displaying a character string and an image indicating information regarding the work in a display area of a device used by the user in a case where the degree of skill estimated is less than a first threshold, displaying the character string indicating the information in the display area in a case where the degree of skill is greater than or equal to the first threshold and is less than a second threshold greater than the first threshold, and highlights a part of the display area according to the information in a case where the degree of skill is greater than or equal to the second threshold.

14. The computer-readable non-transitory recording medium according to claim 13, wherein the estimating further comprises estimating the degree of skill of the user for the work by using a trajectory of a line of sight of the user in the work as the second information.

15. The computer-readable non-transitory recording medium according to claim 13, wherein the estimating further comprises estimating the degree of skill of the user for the work by using at least one of a motion of the user, a history of an operation by the user in the work, or biological information of the user as the second information.

16. The computer-readable non-transitory recording medium according to claim 15, wherein the estimating further comprises:

calculating a first value based on the motion at a predetermined time, a second value based on the history at the predetermined time, and a third value based on the biological information at the predetermined time, acquiring a fourth value that is the degree of skill of the user for the work estimated at a time before the predetermined time, and estimating the degree of skill of the user for the work on a basis of the first value, the second value, the third value, and the fourth value such that:

influence of the first value increases and influence of the fourth value decreases as an amount of experience of the user for the work is smaller, and influence of the second value and the third value increases as the amount of experience of the user for the work is closer to a predetermined average value.

17. The computer-readable non-transitory recording medium according to claim 13, wherein the estimating further comprises estimating the degree of skill of the user on a basis of an evaluation value obtained by inputting the first information and the second information to a learned model.

* * * * *